United States Patent [19]

Johansson

[11] 4,008,496

[45] Feb. 22, 1977

[54] AUTOMATED BATHING PLANT

[76] Inventor: Hans Arne Valentin Johansson, Treharadsvagen 36, S-241 00 Eslov, Sweden

[22] Filed: Aug. 4, 1975

[21] Appl. No.: 601,274

[30] Foreign Application Priority Data

Aug. 7, 1974 Sweden .......................... 7410097

[52] U.S. Cl. .......................................... 4/145; 4/1; 5/81 B; 198/678; 198/793

[51] Int. Cl.² .................... A47K 3/22; A61G 7/08; B65G 17/14; B65G 17/20

[58] Field of Search .................. 4/145, 1, 159, 167; 5/81 R, 81 B; 198/154, 181, 793, 678

[56] References Cited

UNITED STATES PATENTS

| | | | |
|---|---|---|---|
| 2,844,187 | 7/1958 | Scoville | 5/81 R |
| 3,123,224 | 3/1964 | Kral | 5/81 R |
| 3,483,572 | 12/1969 | Hallum | 4/145 |
| 3,517,799 | 6/1970 | Gaftner et al. | 198/181 |
| 3,701,170 | 10/1972 | Bond | 4/145 |
| 3,842,449 | 10/1974 | Geurtsen et al. | 5/81 R |
| 3,846,853 | 11/1974 | Jacobsson | 5/81 R |

*Primary Examiner*—Steven L. Stephan
*Attorney, Agent, or Firm*—John J. Dennemeyer

[57] ABSTRACT

An endless conveyor is mounted above a supporting frame on which are disposed an initial station, a final station, and one or more intermediate treatment stations for bathing a patient. A plurality of spaced carriages depend from the endless conveyor above the stations, and horizontally disposed carrier plates are detachably connected at their head ends to the lower portion of said carriages to project generally normal from the conveyor. The carrier plates are moved to and from the carriages on a wheeled vehicle, and support patients lying in a prone position. The conveyor is operable by a control system that indexes the carrier plates through the various stations in a selected sequence, for bathing a patient in a desired manner.

36 Claims, 11 Drawing Figures

AUTOMATED BATHING PLANT

The present invention relates to a bathing plant which comprises a conveyor system for carrying patients on carrier plates through the plant so that the occupant of each carrier plate may be treated at different stations of the plant.

Bathing plants for bathing a relatively large number of patients during a certain time period exist already in hospitals and nursing homes. To enable as large as possible a number of patients to be bathed during a given time period, usually during one or more bathing days each week, such bathing plants have been furnished with certain automated equipment. Until now the measures taken have not brought the desired improvements because the automated equipment has been assisted by manual handling of the patients during bathing. For instance the patients are moved manually between different treatment stages which results in time losses that cannot be compensated by an automated handling during the treatment.

It is therefore an object of the present invention to obviate this drawback and to provide space-saving bathing equipment which provides a large bathing capacity in terms of the number of patients who can be bathed per time period, and to eliminate manual transporting of the patients between different treatment stages, as well as manual handling of the patients during the treatment cycle.

It is another object of the invention to provide that the patients shall not become exposed to any discomfort during transportation and handling while they are in the bathing plant.

It is still another object of the invention to move a patient automatically for repeated treatment at a particular treatment station through which the patient has already passed.

It is a further object of the invention to remove a patient from the plant without having to stop the plant for any substantial period of time.

It is still a further object of the invention to ensure that a patient being treated in the plant cannot by-pass the final treatment station of the plant.

These and other objects are accomplished by the bathing plant according to the invention described in greater detail hereafter with reference to the accompanying drawings, in which.

The bathing plant of the invention provides automated movement of carrier plates and treatment units in such a manner that the patients can be treated rapidly and simultaneously in the plant, such as undressed, warmed, showered with water, lathered, bathed, dried, and dressed after the bath.

Figure 1:
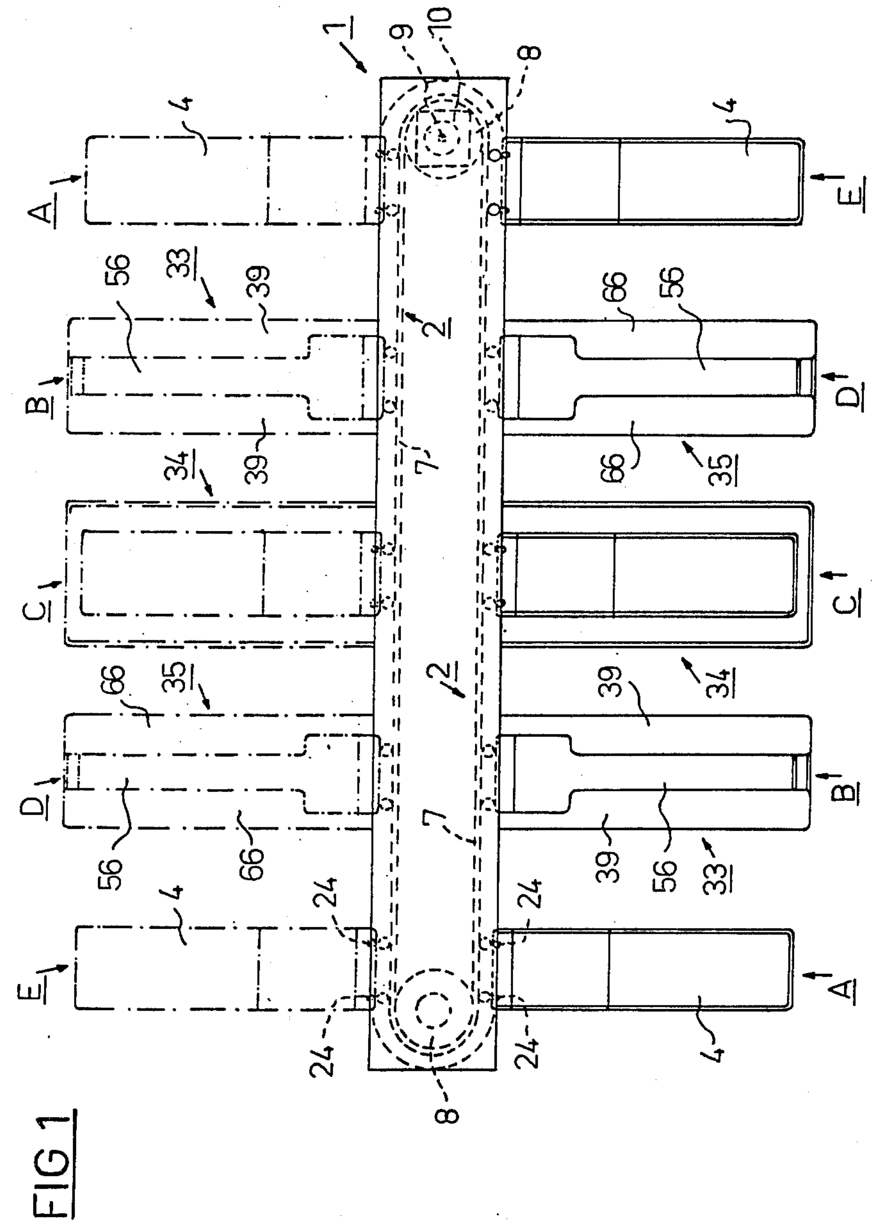
FIG. 1 is a diagrammatic plan view of a bathing plant according to the present invention.
Figure 2:
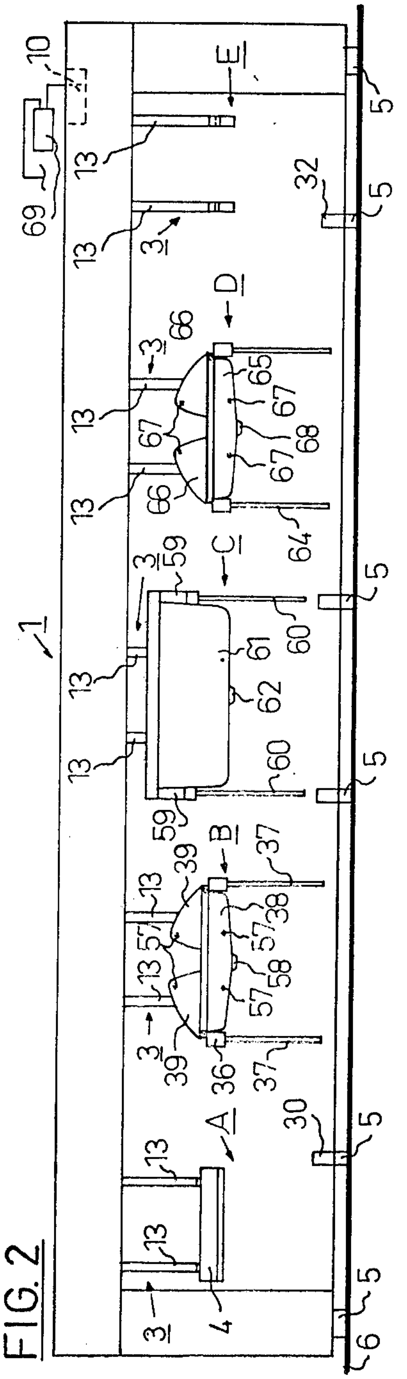
FIG. 2 is a side view illustrating the bathing plant with different treatment units shown in their operative positions.
Figure 3:
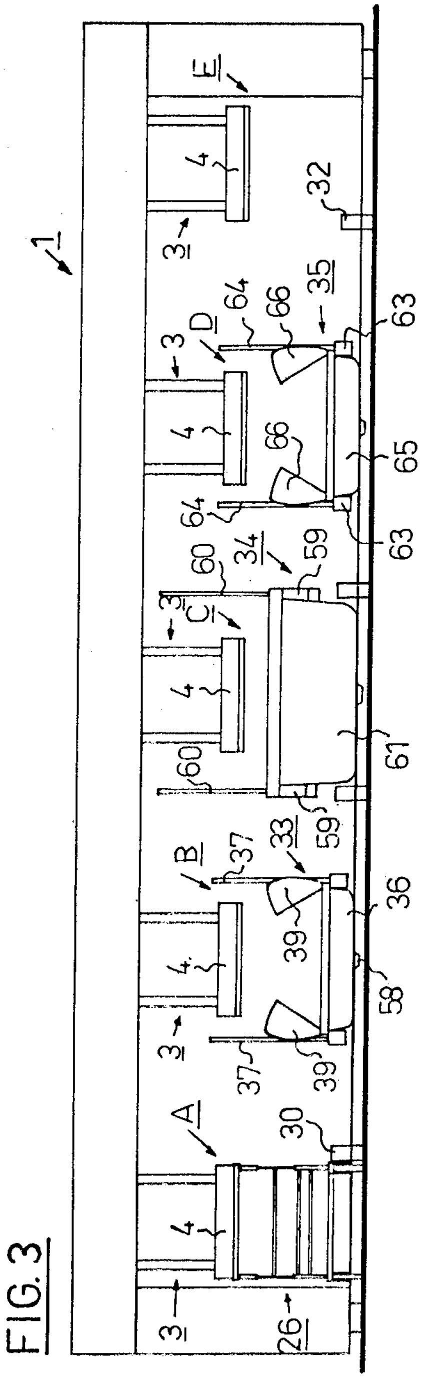
FIG. 3 is a side view illustrating the bathing plant with the treatment units in the inoperative or neutral positions.
Figure 4:
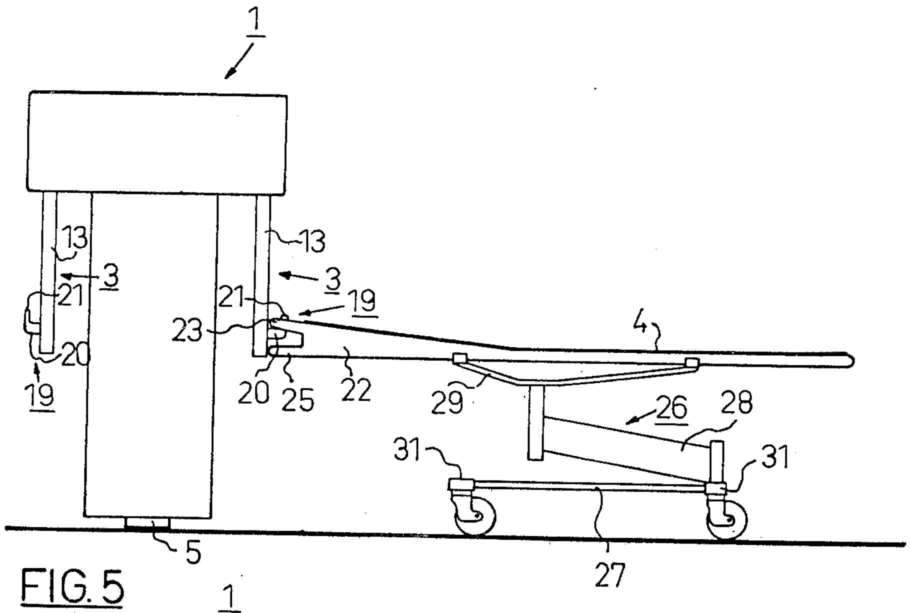
FIG. 4 is a side elevational view of the first and last stations of the plant illustrating a transport carriage moved into position at this station.
Figure 5:
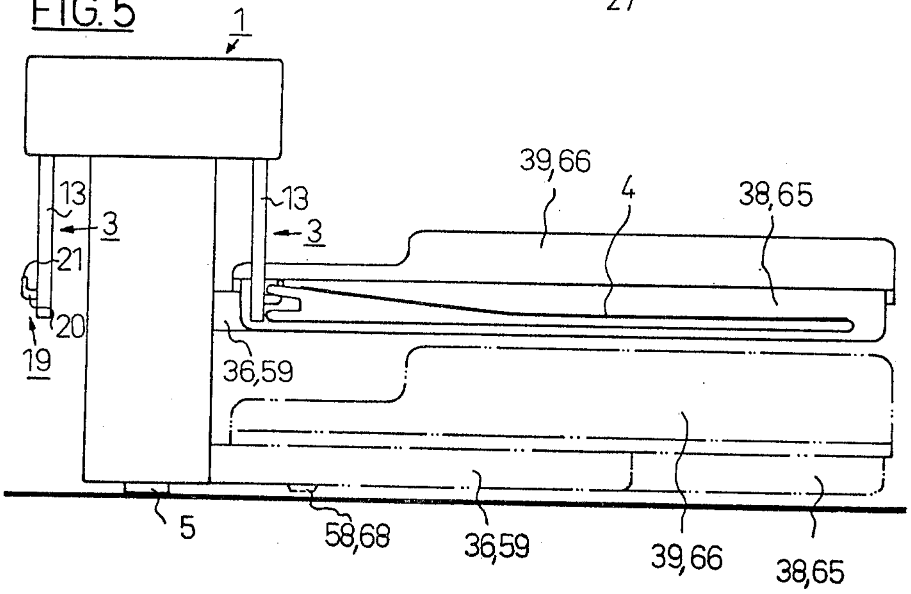
FIG. 5 is a side elevational view illustrating diagrammatically one treatment station of the bathing plant.
Figure 6:
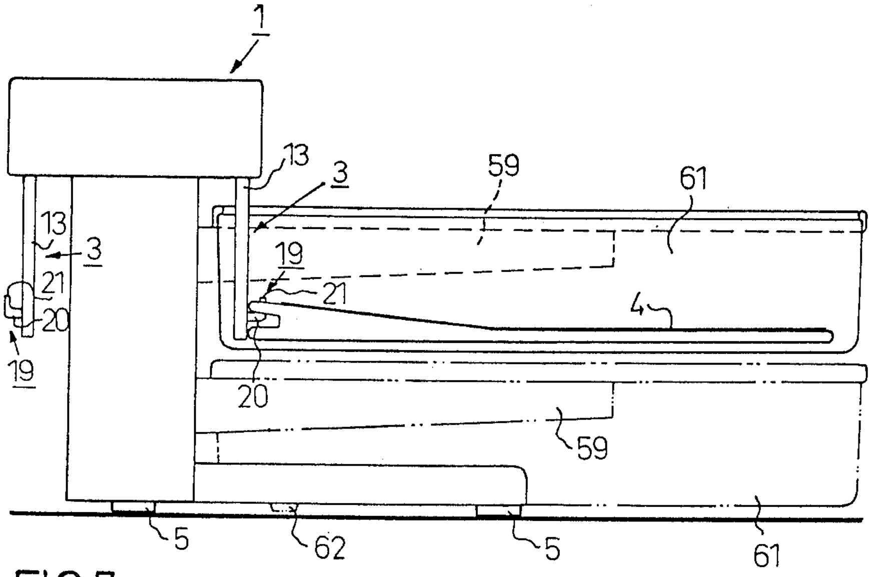
FIG. 6 is a side elevational view illustrating diagrammatically another treatment station of the bathing plant.
Figure 7:
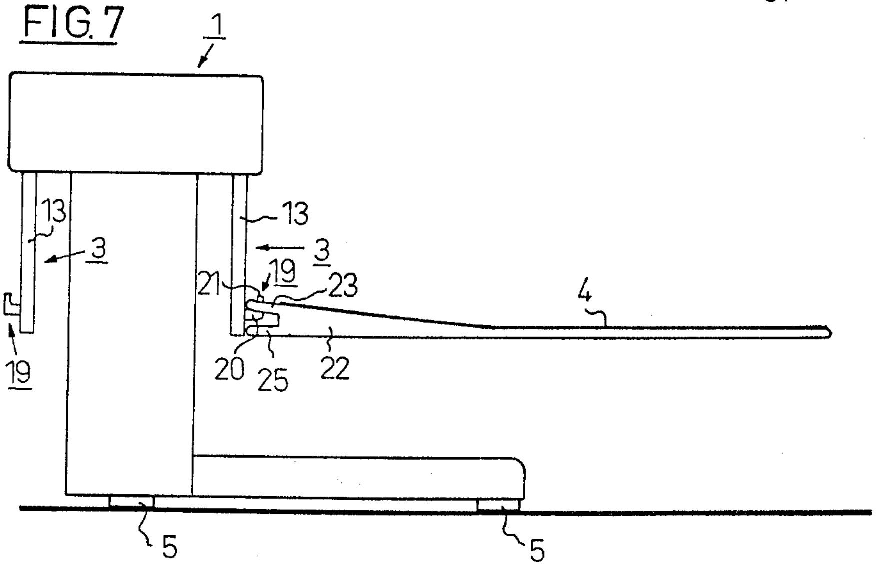
FIG. 7 is a side elevational view of the first and last stations of the plant illustrating a supporting plate in position for transportation through the plant.

To accomplish this sequence of operations the embodiment of the bathing plant according to FIGS. 1-3 comprises a support frame 1, a plurality of treatment stations A to E disposed side by side, and a plurality of carriages 3 forming part of a conveyor 2 and arranged to be moved simultaneously to and away from the stations of the plant. The carriages are to be disposed relative to the stations A to E so that one carriage 3 remains at each station during the same period of time. The conveyor 2 is operated simultaneously with each indexing of the carriages 3 from one station to the next so as to move one of the carriages 3 to a station A at which a carrier plate 4 advanced to this station A can be connected to the carriage 3 so that the carrier plate, which is carried solely by the carriage 3, will stay beside the conveyor 2 while it is advanced by the latter from one station to another, for example from the station A to station B, from station B to station C, etc. Furthermore, the conveyor 2 is arranged to move each of its carriages 3 to a station (E or A) at which the carrier plate 4 can be disconnected from the carriage 3 and removed from the plant.

Figure 8:
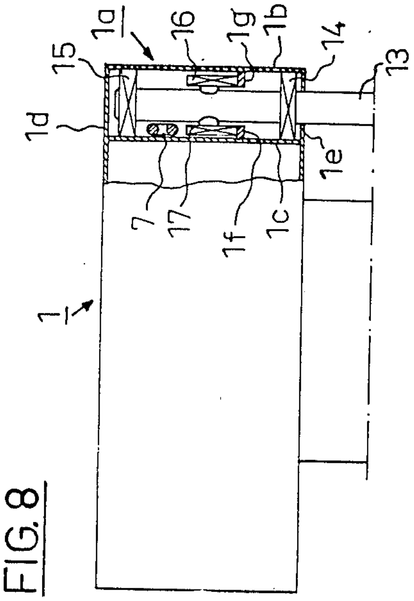
FIG. 8 shows a suspension device of the bathing plant.

In this embodiment the support frame 1 of the bathing plant is elongated in shape and has support legs 5 providing a free-standing disposition on the floor 6 of a bathing plant. The conveyor 2 is carried by the frame 1 and includes an endless chain 7 or the like travelling about two chain pulleys 8 mounted at each end. At least one of these pulleys 8 is fixed to an output shaft 9 of an electric motor 10 or any other suitable driving mechanism mounted on the frame 1. The chain 7 is operatively connected to each carriage 3 through mountings 11, and each carriage 3 comprises two vertically extending arms 13. The frame 1 includes an integral endless track 1*a* (FIG. 8) which is rectangular in cross-section and carries the arms 13. This track consists of two vertically disposed and horizontally spaced frame plates 1*b* and 1*c* and parts of two horizontally disposed spaced frame plates 1*d* and 1*e*. Horizontally directed flanges 1*g* and 1*f* are provided on the plates 1*b* and 1*c* respectively and are intended to form longitudinally extending track elements or rails. Each arm 13 carries on its top end portion two spaced parallel rollers 14 and 15 which are rotatable about the longitudinal axis of the arm 13 and which engage at least one of the plates 1*b*, 1*c* in order to maintain the arm 13 in a vertically directed position. At the upper end portion two rollers 16, 17 of each arm 13 are mounted and rotate about axes that are perpendicular to the longitudinal axis of the arm 13. These rollers 16, 17 travel in engagement with the flange-like track portions 1*g* and 1*f* so that arm 13 may be maintained in a suspended position. The arms 13 of each carriage 3 are maintained in a definite relative position either by means of the chain 7 or by interconnection with fixed struts (not shown). The plate 1*c* of the track 1*a* is provided with apertures (not shown) through which the chain pulleys 8 project into the plate.

Each arm 13 is provided on its lower end with a hook element 19 (FIGS. 4–7) to which a carrier plate 4 may be connected and which carries the plate so that it projects horizontally from the frame 1. Each such hook element 19 includes a neck portion 20 which projects substantially horizontally from the arm 13, and a head portion 21 which projects upwardly in a substantially vertical direction from the neck portion. The carrier plate 4 has an end part 22 with a projecting portion 23 provided with socket elements 24 corresponding to two hook elements 19, and an abutment portion 25 projecting in the same direction beneath this portion 23. By making the spacing between the portions 23 and 25 of the carrier plate 4 slightly larger than the overall height to the upright head portion 21 of each hook element 19, the carrier plate 4 can be disposed so as to align its sockets 24 above the head portions 21. This step is facilitated by locating the sockets 24 in such a manner relative to the edge of the carrier plate 4 as to cause the sockets 24 to be at the same distance from the arms 13 as the upright head portions 21 when the terminal edge engages the arms 13. The coupling between the hooks 19 and sockets 24 is effected by lowering the carrier plate 4 from this position until the plate comes to rest against the horizontally directed neck portion 20 of each hook element 19, and the carrier plate is maintained in a horizontal position by the abutment portion 25 having its terminal edge engaging the arms 13 beneath the hook elements 19.

The carrier plate 4 is transported to and from the bathing equipment by means of transport carriages 26 (FIG. 4) comprising a wheeled chassis 27 and a support unit which is only diagrammatically illustrated in the drawings in the form of a frame 28 having saddles 29 for mounting the carrier plates 4. In actual practice, the frame 28 includes a device for adjusting the saddles 29 vertically, but this device is in the form of a conventional hoist and is therefore not described further.

In order to facilitate the positioning of the transport carriage 26 relative to the frame 1 so that the carrier plate 4 can be connected to the carriages 3 the frame 1 includes a projecting bar 30 (FIGS. 2,3) which is disposed in a predetermined relationship to the carriage 3 at station A, i.e. the interconnecting station. The chassis 27 of the transport carriages 26 further includes abutments 31 which can engage the bar 30 by advancing the transport carriage 26 to the interconnecting station A. The bar 30 and the transport carriage 26 are designed so that the sockets 24 of the carrier plates 4 can be disposed in alignment with the upright head portions 21 of the hook elements 19 when the abutments 31 engage the lateral edge of the bar 30. If, in addition, the transport carriage 28 is so disposed or, while maintaining the contact between the abutments 31 and the bar 30, is moved to cause the end edge of the head end portion 22 of the carrier plate 4 to abut the arms 13, the sockets 24 of the carrier plate will thus be disposed above and in alignment with the upright head portions 21, and the carrier plate can be connected by being lowered by means of a hoist mounted on the transport carriage 26.

At the disconnecting station, i.e. station E, a bar 32 is provided which allows a guiding of the transport carriage 26 when the carrier plates 4 are to be disconnected from the carriage 3. This is effected by moving an empty transport carriage 26 to station E and advancing it until the abutments 31 engage one side of the bar 32 and until, in addition, one of the abutments 31 engages a further abutment element (not shown) on the machine frame 1, which will define the proper distance of the transport carriage 26 from the carriage 3 at station E. When the transport carriage 26 is located in this position, and its hoist is actuated to raise the saddles 29 it will grip from beneath the edges of the carrier plate 4 connected to the carriage 3 and lift the carrier plate 4 so as to disconnect the latter from the hook elements 19 of the carriage 3. Then the carrier plate 4 can be removed from the bathing equipment by means of the transport carriage 26.

For the simultaneous treatment of several patients in the bathing plant the conveyor 2 comprises a number of carriages 3 corresponding to or larger than the number of stations A to E. The carriages 3 are arranged relative to each other so as to cause any carriage 3 to occupy each station A to E for the same time period, i.e. a carrier plate 4 will remain at each station A to E during the same period of time.

In addition to giving the patients a preliminary treatment at the interconnecting station A and a final treatment at the disconnecting station E the main treatment procedure occurs at the intermediate stations B to D. These stations are equipped with treatment units 33, 34 and 35, respectively, which are movable from inoperative positions beneath a horizontal plane along which the carrier plates 4 are moved by the conveyor carriages 3, into operative positions at the level of this horizontal plane, and vice versa.

Figure 9:
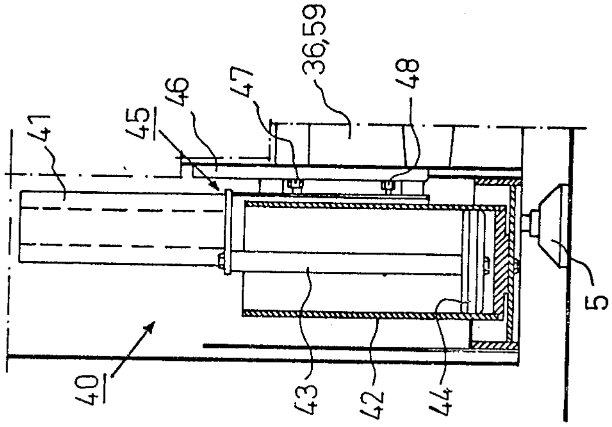
FIG. 9 shows a lifting device of the bathing plant.
Figure 10:
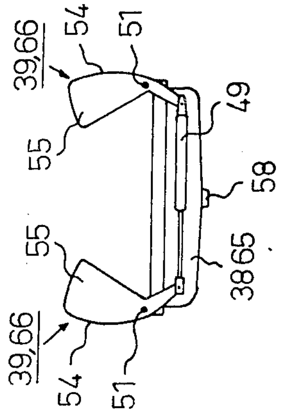
FIGS. 10 and 11 show a treatment unit in its open and closed position respectively.
Figure 11:
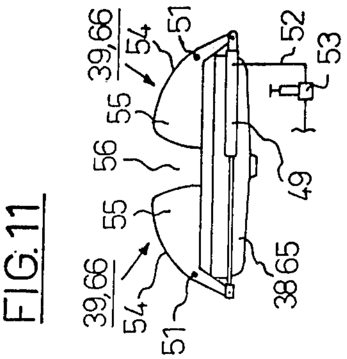

The treatment unit at station B is intended to provide washing and showering of a patient who has been transported by means of a carrier plate 4 to this station. For vertical movement of the treatment unit 33 the frame 1 includes a hoist 40 (FIG. 9). The hoist includes a guiding device mounted on the frame and comprises two vertically extending guide rails 41, preferably of channel-section, and a pressure cylinder 42 also mounted on the frame. Within the cylinder 42 a piston 43 is arranged having a sealing element 44 fixed thereto, and the upper end of the piston carries a carriage 45 which is guided in the rails 41 on rollers (not shown). This carriage 45 comprises a mounting plate 46 to which two arms 36 are attached by bolted connections 47, 48. The arms 36 are horizontally directed and projected from the frame 1 through slots 37 formed in its side wall.

The carriage 45 can be raised by supplying a fluid, such as oil, water, or air under pressure into the cylinder 42 through a conduit (not shown) which opens into the cylinder space beneath the piston sealing element 44. The carriage 45 is lowered by allowing the fluid to escape from the cylinder through this conduit.

The treatment unit 33 rests on the arms 36 and consists of a water collecting tub 38 provided with shields 39 extending along its longitudinal sides. The width of the tub 38 and its length are slightly larger than that of the carrier plate 4 so that the tub 38 can be located with its upper edge above the level of the carrier plate. The shields 39 are pivotally mounted on the tub 38 so as to be pivotable into substantially vertical positions when the treatment unit 33 is raised or lowered to its inoperative position, and swung inwardly above the carrier plate 4 when the treatment unit 33 is in its operative position. The shields 39 are guided on the one hand preferably, so as to be maintained in a slightly inwardly inclined position relative to the tub 38 when the latter is in its operative position (FIG. 3), and on the other hand to swing outwardly so as to be inclined outwardly relative to the tub 38 as the latter is being raised, or lowered, and the shields pass by the carrier plate 4, and further to swing inwardly above the carrier plate 4 after having passed by the latter in taking up their operative position (FIG. 2). This control or guiding of the shields 39 causes any water present on the inner surfaces of the shields 39 after treatment to readily drain off when the treatment unit 33 is moved or has been moved to its inoperative position. This control further means, inter alia, that, when the treatment unit 33 is in its inoperative position, the shields 39 will not obstruct the space along the lateral edges of the carrier plate 4.

The shields 39 are controlled by means of an actuator 49, for instance a cylinder and piston device, which is pivotally connected to the shields beneath their pivot axes 50, 51. The actuator 49 is operable by a pressure fluid supplied through a conduit 52 and the rate of flow of the pressure fluid is controlled by a valve 53 connected into the conduit 52. The actuator 49 is arranged to allow manual adjustment of the shields, for instance by interrupting its communication with the source of pressure fluid (not shown). As a matter of fact, manual adjustment may be necessary, for instance if the treatment must be rapidly interrupted by the bathing attendants.

Each shield 39 is shaped as an elongate, domed cowl 54 having end walls 55 serving as splash guards. The shields are so dimensioned that when in their operative position above a carrier plate 4 at this station they leave an open space 56 above the patient. In addition, the shields 39 have a lower height adjacent the frame 1 whereby the open space 56 has a particularly large width adjacent the frame. This means that the patient will not be completely covered by the shields 39 but that room will be left, particularly above the patient's head and shoulder portions.

Each shield 39 and tub 36 is equipped with a shower device (not shown). This device may comprise pipes 57 disposed in the end walls 55 of the shields 39 and/or in the end walls of the tub. The pipes 57 include holes, nozzles or spray jets which are oriented in a manner to cause the water jets ejected therefrom to be directed onto the patient. As the carrier plate 4 is provided with a network bottom (not shown), water jets can be directed onto the patient from beneath, and water can easily drain into the tub 36.

The shower device may be controlled to supply water jets in a manner to obtain pulsation showering with jets of alternating pressure. This is suitably effected by causing water surges to flow through conduits (not shown) to the shower pipes 57 in the shields 39 and/or the tub 36. The patient, alternatively, can be showered with liquids other than water, such as, for example with a soap solution or with water in a mixture with a certain proportion of any other liquid. To prevent splashing towards the machine frame 1, the tub 36 may be so designed that one end wall (that next to the frame 1) thereof is disposed between the carriage 3 and the frame 1 when the tub is in its operative position. The water collected in the tub 36 can be drained through an outlet or drain pipe 58, and this pipe 58 is suitably arranged to project into a branch pipe (not shown) leading to a sewage system when the tub 36 is in its lowered position.

The treatment unit 34 at station C provides for bathing of a patient being treated. The treatment unit 34 may be raised and lowered at station D by means of a hoist 40 whose horizontally extending arms 59 project outwardly through slots 60 made in the sheet metal frame wall. The treatment unit 34 consists of a tub 61 whose longitudinally extending top edge portions are supported on the arms 59 from above. The tub 61 may have overflow apertures in its upper wall portions defining a maximum water level in the tub 61, i.e. preventing the tub from being filled above a certain limit. As an alternative, the means for supplying water (not shown) may be controlled so as to fill the tub only up to a certain level. A water faucet (not shown) for filling the tub 61 may be mounted on the hoist carriage 45, and the water supply for this faucet may be a flexible hose.

The hoist 40 for the bath tub 61 is arranged to raise the tub 61 to cause the occupant of the carrier plate 4 to be immersed in water, simultaneously ensuring, however, by the upwardly inclined front end portion of the carrier plate 4 that the patient's shoulders and head will remain above the water surface during bathing. The tub 61 has an outlet pipe 62 for draining the bath water, and this pipe is arranged to project into a branch pipe (not shown) leading to a sewage system when the tub is in its lowered position.

The treatment unit 35 at station D is intended to allow drying and/or cooling of the patient. For raising and lowering this treatment unit 35 station D is equipped with a hoist 40 whose horizontally extending arms 63 of project outwardly through slots 64 made in the sheet metal wall of the machine frame 1. The treatment unit 35 comprises a water-collecting tub 65 having shields 66 extending along its longitudinal sides. The tub 65 is dimensioned and designed similar to the tub 38 at station B. The shields 66 are pivotally mounted on the tub 65 and are arranged and dimensioned similar to the shields 39 at station B. Furthermore the control of the shields 66 is made identical to the control of the shields 39 at station B, but the shower pipes 57 of station B are replaced by air supply pipes at station D. These air supply pipes are disposed in the shields 66 or in the tub 65 similar to the shower pipes 57 at station B. The pipes 67 are provided with air discharging orifices or nozzles whereby air streams are directed onto the patient occupying the carrier plate 4. The pipes 67 are connected to a source of air under pressure (not shown) which is suitably so arranged that the temperature of the air streams discharged may be varied in order to attain, for example, a so-called temperature toning effect.

Due to the shape of the shields 66 they act as drying hoods, and any water flowing down into the tub 65 is drained through a discharge pipe 68 projecting into a branch pipe (not shown) of a sewage system when the tub 65 is in its lower position.

The arms 36, 59 and 63, at stations B, C, and D respectively, are spaced relative to each other by a distance greater than the width of the carrier plates 4, and the width and length of the tubs 38, 61 and 67 respectively, is greater than that of the carrier plates, so that they can be raised to a level at which the bottom of the tub is disposed in the vicinity of the bottom edge of the carrier plates, so that the carrier plates 4 are located within the tubs. The latter can be lowered by an amount such that the carrier plates 4 become free and can be moved laterally above the tub.

The movement of the carriages 3 is controlled by a program unit or control device 69 causing the movement to be indexed or to proceed step-by-step from one station to the next one. The treatment units 33 to 35 are also controlled by this control device 69 so as to be raised and lowered as required. A switch (not shown) is mounted at each station A to E within easy reach of the attendant and can be operated as required to interrupt the progress of the treatment program chosen, thereby allowing the treatment to be interrupted at any time, for instance to remove one or more patients from the plant and continuing the treatment of the remaining patients.

The control device 69 controls the speed of movement of the carrier plates 4 and also determines the dwelling time of the carrier plates at each station. The control device 69 is controlled so that the carrier plates 4 are retained at stations A to E for a standard period of time, if the carrier plate 4 which has been moved to station E for disconnection has had sufficient time to be disconnected from its carriage 3 within this period of time, but they are, nevertheless, retained for a sufficient time at the stations until the disconnection has occured, even if the standard period of time is exceeded.

A pressure switch (not shown) is mounted at the disconnecting station E and adapted to actuate either the control device 69 or the drive motor 10 in response to the load on a carriage 3 at this station. This pressure switch is adapted to prevent any continued indexing of the carrier plates 4 as long as a carriage 3 is keeping a carrier plate 4 at station E. Only after the carrier plate 4 has been disconnected from the carriage 3 (i.e. after the pressure acting on the switch has been relieved), can the indexing of carriages 3 continue. As a consequence the carriage 3 cannot move the carrier plates past station E or away from station E in the reverse direction.

The following treatments, for example, can be executed by means of the bathing plant according to the embodiment described and illustrated:

A. - Overall or complete treatment: - shower-bath-automatic drying;

B. - Bath with automatic drying;

C. - Bath with manual drying;

D. - Shower with automatic drying (a treatment particularly suitable for mental nursing applications).

For carrying out the various treatments, each carrier plate 4 is moved as follows:

| A | B | C | D |
| --- | --- | --- | --- |
| Station A | Station A | Station A | Station A |
| Station B | | | Station B |
| Station C | Station C | Station C | |
| Station D | Station D | | Station D |
| Station E | Station E | | Station E |

These and various other programs can be selected by setting the control device 69 as required.

Thus, if an overall treatment (shower, bath, automatic drying) of several patients is to be carried out, the control device 69 is programmed for this process, and the treatment will be carried out as follows:

A first patient lying (or possibly sitting) on a carrier plate 4 is moved to station A. The patient is uncovered and undressed (this may have been done in advance) and the carrier plate 4 is connected to a carriage 3. At this station A the patient may be given a warming-up treatment in order not to feel any discomfort while waiting. The warming-up treatment may be obtained from a hot-air supply device (not shown). Thereafter the carrier plate 4 is moved laterally to station B, and another carrier plate 4 may be connected at station A when the first carrier plate is at station B. The treatment unit 33 of station B is raised into its operative position and the patient is showered — for instance by a pulsating shower in which the water jets will have an alternatively higher and lower pressure imparted to them. After having completed (possibly including manual washing) at station B, the treatment unit 33 is lowered to its inoperative position, and the first carrier plate is indexed to station C, the second plate simultaneously to station B, and a third plate may be connected at station A. The treatment units 33 and 34 are raised, and the occupant of the first carrier plate 4 is bathed and allowed to rest in a prone position, while the occupant of the second carrier plate 4 is being showered at station B. The dwelling time at station C is about 10 minutes, and this dwelling time thus determines the treatment rhythm and the connecting and disconnecting times at the other stations. Thereafter the first carrier plate 4 is moved to station D, and the treatment units 33, 34, 35 are raised so that, sequentially, the first patient is dried at station D, the air temperature can be adjusted so that an agreeable cooling is effected at the same time, the second patient is bathed at station C, the third patient is showered at station B and a fourth patient's carrier plate 4 is connected at station A. By further indexing, the carrier plate 4 with the first patient will arrive at station E, and the patient is covered (possibly after having been dressed). His carrier plate 4 is disconnected and removed from the plant — the patient at station E could be subjected to hot air streams so as not to feel any discomfort after bathing because of a low temperature in the bath hall. The hot air is suppled by a hot-air supply source (not shown). Simultaneously with the disconnection of the first patient's carrier plate 4 at station E, one patient is dried at station D, one patient is bathed at station C, one patient is showered at station B and a carrier plate for a fifth patient is connected at station A. Consequently, five patients can be treated at the same time in the plant for a so-called overall or complete treatment (shower-bath-automatic drying).

For a two-sided utilization of the frame 1, a number of stations A to E may be arranged side by side along one side of the frame 1 and a corresponding number of stations A to E along the opposite side of the frame. The stations A to E along one side of the frame 1 are arranged in the reverse order relative to the stations along the other side of the frame, but are otherwise of the same type. As a result, it will be possible to treat simultaneously up to ten patients in a comparatively small bathing plant.

To summarize, the bathing plant according to the present invention provides the following advantages:

A. — A larger number of patients can be treated at the same time in different ways;

B. — In the course of the treatment each patient is moved laterally and faces away from the machine frame so that visual contact with neighbours is substantially eliminated while visual contact with bath attendants is facilitated;

C. — The patients are only moved in a horizontal direction and thus will not be subjected to vertical hoisting movements which could induce feelings of discomfort;

D. — The patients can be conveyed at a relatively low level to the floor;

E. — The attending personnel can easily observe the patients during all treatments and movements;

F. — The attending personnel can reach the patients for treatment from three sides, along the foot-end and the two longitudinal sides;

G. — The attending personnel can interrupt the treatment at any time and remove the patient from any station of the plant; the treatment units 33 to 35 can be lowered independently of each other and independently of the automatic control of the plant; this may be effected by means of switching devices at the stations B, C and D;

H. — Different treatment programs or sequences can be selected;

I. — The plant can be disposed free-standing on the floor and can be moved as required; there is no need to make special preparations for the bathing plant by building foundations or similar permanent structures.

In addition to the advantages thus recited, a patient could also be treated repeatedly at the same station by being moved several times between two stations.

The bathing plant according to the embodiment described and illustrated herein can be varied within the scope of the appended claims, for instance, by varying the number of stations from three to ten or more.

What is claimed is:

1. An automated bathing plant, comprising:

a supporting frame;

a plurality of spaced stations arranged in a line on said supporting frame, and including an initial station, a final station, and at least one treatment station between said initial and said final stations;

conveyor means mounted above said spaced stations on said supporting frame, and including a plurality of spaced, depending carriages, said conveyor means being operable to progressively move said carriages linearly from one station to another, and further including control means effective to operate said conveyor means for moving said carriages and to position said carriages at said stations for a prescribed period of time;

mounting means carried on said depending carriages;

a plurality of horizontally disposed carrier plates each adapted to support a patient lying in a prone position, and each including a head end and a foot end; and attaching means on the head end of each of said carrier plates engageable with said mounting means carried on said depending carriages for detachably mounting said carrier plates on said carriages to project horizontally from and generally normal to the direction of movement of said carriages, said carriages being spaced apart a distance sufficient to provide access by attendants to both sides of said carrier plates.

2. An automated bathing plant according to claim 1, wherein said mounting means on said depending carriages comprises two hook elements projecting substantially horizontally from each said carriage and terminating in an upright head portion, said hook elements being spaced above the lower end of said carriage, and wherein said attaching means includes socket means formed on said head end of each of said carrier plates and arranged to be engaged over said upright head portions of said hook elements, and an abutment on said head end of said carrier plate below said socket means and adapted to abut said carriage beneath said hook elements when said carrier plate is mounted on said carriage, the height of said upright head portions of said hook elements being less then the distance between said socket means and said abutment on said head end of said carrier plate.

3. A bathing plant according to claim 2 wherein each carriage comprises two arms projecting vertically downwardly toward said stations, each arm carrying a hook element on its bottom-end portion.

4. A bathing plant according to claim 1, wherein said conveyor means and said carriages are arranged to index said carrier plates through said plant and retain said plates at said plurality of stations while maintaining said plates at a constant level of elevation.

5. A bathing plant according to claim 1, including additionally at each station an interrupter connected with said control means which is operable individually at any station to interrupt the operation of said plant, and wherein each treatment station located between said initial and said final stations is equipped with a resetting device connected with said control means and combinable with an interrupter, said devices being adapted to reset said treatment stations from their operative to their inoperative positions.

6. A bathing plant according to claim 1 wherein each carrier plate to be conveyed through said plant and carrying a patient to be treated includes a perforated bottom adapted to allow passage of water and air.

7. An automated bathing plant, comprising:

a supporting frame;

a plurality of spaced stations arranged in a line on said supporting frame, and including an initial station, a final station, and at least one treatment station between said initial and said final stations;

conveyor means mounted above said spaced stations on said supporting frame, and including a plurality of spaced, depending carriages, said conveyor means being operable to progressively move said carriages linearly from one station to another, and further including control means effective to operate said conveyor means for moving said carriages and to position said carriages at said stations for a prescribed period of time;

mounting means on said depending carriages, comprising two hook elements projecting substantially horizontally from each carriage and terminating in an upright head portion, said hook elements being spaced above the lower end of said carriage;

a plurality of horizontally disposed carrier plates each adapted to support a patient lying in a prone position, and each including a head end and a foot end;

attaching means on the head end of each of said carrier plates engageable with said mounting means carried on said depending carriages for detachably mounting said carrier plates on said carriages to project horizontally from and generally normal to the direction of movement of said carriages, said carriages being spaced apart a distance sufficient to provide access by attendants to both sides of said carrier plates, and said attaching means comprising socket means formed on said head end of said carrier plate and arranged to be engaged over said upright head portions of said hook elements, and an abutment on said head end of said carrier plate below said socket means and adapted to abut said carriage beneath said hook elements when said carrier plate is mounted on said carriage, the height of said upright head portions of said hook elements being less than the distance between said socket means and said abutment on said head end;

vehicle means for transporting said carrier plates to and away from said carriages, and including chassis means, and means operable to raise and lower said carrier plates;

vehicle abutment means carried by said supporting frame at said initial station; and abutment means on said chassis means engageable with said vehicle abutment means when said vehicle means has been moved to place a carrier plate thereon in position for engaging said socket means on said carrier plate with said hook elements, said vehicle means being operable to raise and lower said carrier plate for connecting it to said carriage.

8. A bathing plant according to claim 7, including additionally a second vehicle abutment means on said supporting frame at said final station, engageable by said abutment means on said chassis for properly aligning said vehicle means beneath a carrier plate before undertaking to remove said carrier plate from its carriage.

9. A bathing plant according to claim 8 wherein said carriages are controlled to remain at said stations for a standard period of time if a carrier plate at said final station can be disconnected from its carriage during this time period but remain at said stations until disconnection has occured, even if said standard period of time is exceeded.

10. A bathing plant according to claim 9 wherein said control means for said conveyor means includes at least one interrupter switch operable in response to loads on said carriage to prevent movement of said carriages when a carriage supporting a carrier plate has arrived at said final disconnecting station until the load on said carriage located at said final station is entirely or substantially relieved and said carrier plate is disconnected.

11. An automated bathing plant, comprising:

a supporting frame;

a plurality of spaced stations arranged in a line on said supporting frame, and including an initial station for performing an uncovering, undressing and warming-up activity with a patient, a final station for performing a dressing and warming-up activity, and between said initial and said final stations in sequence a washing and showering station, a bathing station, and a drying and cooling station;

conveyor means mounted above said spaced stations on said supporting frame, and including a plurality of spaced, depending carriages, said conveyor means being operable to progressively move said carriages linearly from one station to another, and further including control means effective to operate said conveyor means for indexing said carriages through said stations and to position said carriages at said stations for a prescribed period of time;

mounting means carried on said depending carriages;

a plurality of horizontally disposed carrier plates each adapted to support a patient lying in a prone position, and each including a head end and a foot end; and attaching means on the head end of each of said carrier plates engageable with said mounting means carried on said depending carriages for detachably mounting said carrier plates on said carriages to project horizontally from and generally normal to the direction of movement of said carriages, said carrier plates being supported at a constant level of elevation, and said carriages being spaced apart a distance sufficient to provide access by attendants to both sides of said carrier plates.

12. A bathing plant according to claim 11, wherein said washing and showering station comprises a treatment unit including vertical guiding means comprising two guides each carrying an arm movably mounted thereon, said arms being directed relative to a carrier plate located at said washing and showering station to extend in parallel relation to the lateral edges of said carrier plate and being spaced apart by an amount greater than the width of said carrier plate, said arms carrying a water collecting tub and being vertically movable along said guides from a lowered position sufficiently beneath said carrier plate that said carrier plate can be moved to and from said washing and showering station, to a raised position relative to a carrier plate located at said washing and showering station wherein the bottom of said water collecting tub carried by said arms is situated beneath the underside of said carrier plate, and the side walls of said tub extend along the sides of said carrier plate and are level with the top edge of said carrier plate or slightly thereabove, said tub carrying shield means extending along its two longitudinal side walls, said shield means being pivotally mounted to swing inwardly above said carrier plate and over a patient lying on said plate, said washing and showering station further including in combination with said tub a shower device adapted to direct water jets on a patient.

13. A bathing plant according to claim 12, wherein said shield means includes shields dimensioned and arranged to form splash guards during showering, and to leave an open space above said carrier plate and the patient lying thereon when said shields are swung inwardly above said carrier plate.

14. A bathing plant according to claim 12 including a showering arrangement comprising pipes provided with nozzle means for discharging water jets mounted in the end walls of said shields or of said tub.

15. A bathing plant according to claim 14 wherein said shower arrangement is controlled to provide a pulsating shower by emitting water jets of alternating pressures.

16. A bathing plant according to claim 15, wherein said shower arrangement is connected and arranged to emit jets consisting of soap solutions.

17. A bathing plant according to claim 16, wherein each shield has a lower height along the head end portion of said carrier plate than along the remaining portion thereof.

18. A bathing plant according to claim 17 wherein said tub has one side disposed outside said carriages when said tub is disposed adjacent said carrier plate.

19. A bathing plant according to claim 18 wherein said shields are controlled to remain in a slightly inwardly inclined position relative to said tub in its lower position, to swing outwardly to be inclined outwardly relative to said tub when it is raised and said shields move past said carrier plate, and to swing inwardly above said carrier plate when advanced past said plate.

20. A bathing plant according to claim 19 wherein said tub collects spill water and includes a spill-water discharge pipe arranged to project into a branch pipe of a sewage system when said tub is in its lowered position.

21. A bathing plant according to claim 20 wherein said shields cover a minor portion of the head end of each carrier plate and only along its lateral edges, and span about two thirds of the width of the remaining portions of said carrier plate.

22. A bathing plant according to claim 11, wherein said bathing station comprises a treatment unit having vertical guide means, and a pair of arms mounted on said guide means for vertical movement relative to a carrier plate disposed at said bathing station, said arms being directed in a parallel relation to the side edges of said carrier plate and being spaced apart further than the width of said carrier plate, said arms carrying a bath tub and being vertically displaceable along said guide means from a lowered position beneath said carrier plate so that said carrier plate can be moved to and from said bathing station, to a raised position relative to a carrier plate located at said bathing station wherein the bottom of said tub is disposed beneath the underside of said carrier plate, with the side walls of said tub extending upwardly past the sides of said carrier plate so that the body of the patient on said carrier plate will be in contact with water contained in said tub.

23. A bathing plant according to claim 22, including additionally means for supplying water to said tub, controllable to fill said tub to a predetermined level.

24. A bathing plant according to claim 23 wherein the means for supplying water to said tub are controllable to supply water continuously, and said tub is provided with at least one overflow arrangement to prevent the water level in said tub from rising above a predetermined level.

25. A bathing plant according to claim 24 wherein said tub has a bath-water discharge pipe projecting into a branch pipe of a sewage system when said tub is moved to its lower position.

26. A bathing plant according to claim 11, wherein said drying and cooling station comprises vertical guide means, two arms displaceably mounted on said guide means for vertical movement, said arms being directed relative to a carrier plate located at said drying and cooling station to extend in spaced parallel relation to the lateral edges of the carrier plate and being spaced apart a distance greater than the width of said carrier plate, said arms carrying between them a water-collecting tub and being vertically movable along said guide means from a lowered position sufficiently beneath said carrier plate that said carrier plate can be moved to and from said drying and cooling station, to a raised position relative to a carrier plate located at said drying and cooling station wherein the bottom of said tub is disposed beneath the underside of said carrier plate and the side walls of said tub extend upwardly along the sides of said carrier plate, shields extending along the upper edges of the longitudinal side walls of the tub and pivotally mounted to be swung inwardly above said carrier plate, and air-supply means in combination with said tub and said shields for directing air-streams on a patient for drying and temperature toning.

27. A bathing plant according to claim 26 wherein said shields form drying hoods during the drying procedure and leave an open space above said carrier plate and a patient when swung inwardly above said carrier plate.

28. A bathing plant according to claim 27 wherein said shields cover a minor portion of the head end portion of said carrier plate and only along its lateral edges, and cover about two thirds of the width of the remaining portions of said carrier plate.

29. A bathing plant according to claim 28, wherein each shield includes two end walls, and wherein said air-supply means is mounted on said shields and in said tub, and comprises pipes having spray-nozzles for emitting air-streams mounted on said end-walls of said shield and on end-walls of said tub.

30. A bathing plant according to claim 29 wherein each shield has a lower height along the head end portion of said carrier plate than along the remainder of the side wall of said carrier plate.

31. A bathing plant according to claim 30 wherein said tub has one side wall disposed outside said carriages when said tub is disposed adjacent said carrier plate.

32. A bathing plant according to claim 31, wherein said shields are arranged and controlled:

a. to remain in a slightly inwardly inclined position relative to said tub when the tub is in its lowered position;

b. to swing outwardly so as to be outwardly inclined relative to said tub when said tub is raised and the shields pass by said carrier plate; and c. to pivot inwardly above said carrier plate after having passed it.

33. A bathing plant according to claim 32, wherein said tub collects spill water, and includes a spill-water discharge pipe arranged to project into a branch pipe of a sewage system when said tub is in its lower position.

34. A bathing plant according to claim 11, wherein said control means is constructed and arranged to selectively move said carrier plates through any one of the following operating sequences:

a. initial station, washing and showering station, bathing station, drying and cooling station, and final station, for overall treatment of patients;

b. initial station, washing and showering station, drying and cooling station, and final station, for the treatment of patients without any rehabilitation bath;

c. initial station, bathing station, drying and cooling station, and final station, for the bath treatment of patients without any showering step but with automatic drying; and d. initial station, bathing station, and directly back from bathing station to initial station, whereby disconnection of said carrier plate from said carriage is effected at said initial station.

35. An automated bathing plant, comprising:

a supporting frame;

a plurality of spaced stations arranged in a line on said supporting frame, and including an initial station, a final station, and at least one treatment station between said initial and said final stations;

conveyor means mounted above said spaced stations on said supporting frame, said conveyor means including: a pair of oppositely facing horizontally extending guide means; two end pulleys disposed at opposite ends of said guide means; means for driving at least one of said pulleys; and an endless conveying element carried by said guide means and said pulleys;

a plurality of depending carriages connected at their upper ends to said endless conveying element, said conveyor means being operable to progressively move said carriages linearly from one station to another;

control means effective to operate said conveyor means for moving said carriages and to position said carriages at said stations for a prescribed period of time;

mounting means carried on the lower ends of said depending carriages;

a plurality of horizontally disposed carrier plates each adapted to support a patient lying in a prone position, and each including a head end and a foot end; and attaching means on the head end of each of said carrier plates engageable with said mounting means carried on said depending carriages for detachably mounting said carrier plates on said carriages to project horizontally from and generally normal to the direction of movement of said carriages, said carriages being spaced apart a distance sufficient to provide access by attendants to both sides of said carrier plates.

36. A bathing plant according to claim 35, wherein an equal number of stations of the same type are disposed along the opposite sides of said conveyor means on said supporting frame, the stations on a first side of said conveyor means being disposed in the reverse order relative to the stations along the other side of said conveyor means.

* * * * *